US010845661B2

(12) United States Patent
Nakagawa

(10) Patent No.: US 10,845,661 B2
(45) Date of Patent: Nov. 24, 2020

(54) LIQUID CRYSTAL DISPLAY DEVICE

(71) Applicant: Panasonic Liquid Crystal Display Co., Ltd., Himeji (JP)

(72) Inventor: Teruhisa Nakagawa, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/284,726

(22) Filed: Feb. 25, 2019

(65) Prior Publication Data
US 2019/0265566 A1 Aug. 29, 2019

(30) Foreign Application Priority Data

Feb. 28, 2018 (JP) .................. 2018-035131

(51) Int. Cl.
*G02F 1/1362* (2006.01)
*G02F 1/1339* (2006.01)
*G02F 1/1343* (2006.01)
*G02F 1/1345* (2006.01)

(52) U.S. Cl.
CPC .... *G02F 1/136286* (2013.01); *G02F 1/13394* (2013.01); *G02F 2001/13456* (2013.01); *G02F 2001/134345* (2013.01)

(58) Field of Classification Search
CPC ..... G02F 2001/13456; G02F 1/136286; G02F 1/1368; G02F 1/13394
See application file for complete search history.

(56) References Cited

U.S. PATENT DOCUMENTS

2013/0128206 A1 5/2013 Nakano et al.
2014/0118673 A1* 5/2014 Park .................. G02F 1/134363
349/138
2014/0168553 A1* 6/2014 Park .................. G02F 1/136286
349/43
2017/0285419 A1 10/2017 Kajita et al.

FOREIGN PATENT DOCUMENTS

| JP | 10-171369 | 6/1998 |
| JP | 2010-181482 | 8/2010 |
| JP | 2011-043774 | 3/2011 |
| JP | 2013-130862 | 7/2013 |
| JP | 2014-119754 | 6/2014 |

OTHER PUBLICATIONS

Office Action issued in corresponding Japanese Patent Application No. 2018-035131, dated Aug. 11, 2020, 9 pages.

* cited by examiner

*Primary Examiner* — Jessica M Merlin
(74) *Attorney, Agent, or Firm* — Hamre, Schumann, Mueller & Larson, P.C.

(57) ABSTRACT

A liquid crystal display device comprises: a plurality of pixels arranged in a first direction and a second direction intersecting the first direction, the plurality of pixels including a first pixel, a second pixel, and a third pixel; a plurality of subpixel electrodes arranged in each of the plurality of pixels in the second direction; a plurality of source lines extending in the first direction and crossing a space between the plurality of subpixel electrodes and a space between the first pixel and the second pixel; a first gate lead line extending in the first direction and crossing a space between the first pixel and the second pixel; and a first gate line extending in the second direction, crossing a space between the first pixel and the third pixel, and is electrically connected to the first gate lead line.

18 Claims, 8 Drawing Sheets

LIQUID CRYSTAL DISPLAY DEVICE

CROSS-REFERENCE TO RELATED APPLICATION

This application claims priority from Japanese application JP 2018-035131, filed Feb. 28, 2018. This Japanese application is incorporated herein by reference.

BACKGROUND

1. Technical Field

The present disclosure relates to a liquid crystal display device.

2. Description of the Related Art

Conventionally, there has been proposed a technique of achieving a so-called narrowed frame in which an area of a frame region around a display region is reduced in a display device such as a liquid crystal display device. For example, Unexamined Japanese Patent Publication No. 2014-119754 discloses a configuration in which the narrowed frame is achieved by disposing a gate signal line drive circuit and a source signal line drive circuit on one side of the display region.

For example, a source line extending in a vertical direction from a source driver, a vertical gate line running in parallel to the source line, and a horizontal gate line that is electrically connected to the vertical gate line and is orthogonal to the vertical gate line and the source line are disclosed in FIG. 9 of Unexamined Japanese Patent Publication No. 2014-119754. Unexamined Japanese Patent Publication No. 2014-119754 also discloses a structure, in which one pixel includes three subpixels, in each of which one of color filters of red, green, and blue is arranged, and the vertical gate line is disposed between green and blue subpixels or between red and green subpixels.

SUMMARY

However, in the configuration disclosed in PTL 1, there is a problem in that unevenness is generated in the displayed image. That is, in the conventional configuration, because a gate lead line is disposed between the subpixels included in one pixel, an interval between the subpixels with the gate lead line interposed therebetween is larger than an interval between other subpixels, which results in the generation of the unevenness in the image.

The present disclosure has been made in view of the above circumstances, and an object of the present disclosure is to prevent the generation of the unevenness in the displayed image in the liquid crystal display device including the gate lead line running in parallel to the source line.

To solve the above problem, a liquid crystal display device according to a present disclosure comprises: a plurality of pixels arranged in a first direction and a second direction intersecting the first direction, the plurality of pixels including a first pixel, a second pixel disposed adjacent to the first pixel in the second direction, and a third pixel disposed adjacent to the first pixel in the first direction; a plurality of subpixel electrodes arranged in each of the plurality of pixels in the second direction; a plurality of source lines extending in the first direction and crossing a space between the plurality of subpixel electrodes and a space between the first pixel and the second pixel; a first gate lead line extending in the first direction and crossing a space between the first pixel and the second pixel; and a first gate line extending in the second direction, crossing a space between the first pixel and the third pixel, and is electrically connected to the first gate lead line.

The liquid crystal display device according to the present disclosure can prevent the generation of the unevenness in the displayed image.

Hereinafter, an exemplary embodiment of the present disclosure will be described with reference to the drawings. In the exemplary embodiment, a liquid crystal display device is described as an example of display device. However the present disclosure is not limited to the liquid crystal display device. For example the present disclosure may be an organic electroluminescence display (OLED) device.

Exemplary Embodiment

Figure 1:
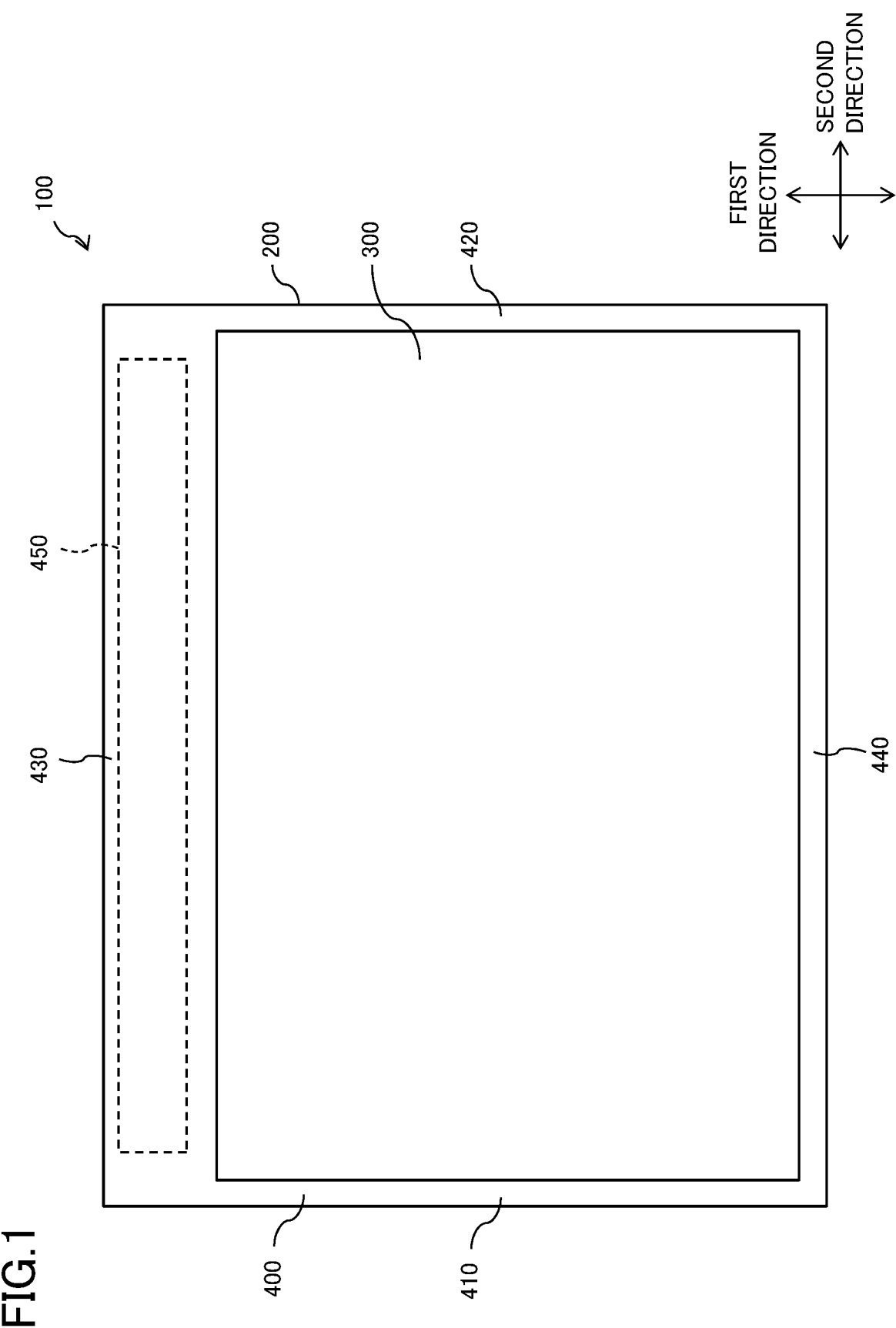
FIG. 1 is a plan view illustrating a schematic configuration of a liquid crystal display device according to an exemplary embodiment.

FIG. 1 is a plan view illustrating a schematic configuration of a liquid crystal display device according to an exemplary embodiment. Liquid crystal display device 100 mainly includes display panel 200 and a backlight (not illustrated) disposed on a rear surface side of display panel 200. A region of display panel 200 is roughly divided into display region 300 where an image is displayed, and frame region 400 located around an outside of display region 300. Frame region 400 includes left region 410 on a left outside (left side) of display region 300 when viewed from a viewer, right region 420 on a right outside (right side), upper region 430 on an upper outside (upper side), and lower region 440 on a lower outside (lower side).

One side of frame region 400 includes drive circuit region 450 where a drive circuit (a gate driver and a source driver) that displays an image is provided. In liquid crystal display device 100, drive circuit region 450 is included in upper region 430. A location of drive circuit region 450 in frame region 400 is not limited, but is determined according to a structure (a vertical type or a lateral type) of liquid crystal display device 100. Drive circuit region 450 may be included only in one side of frame region 400, or included in two sides that is opposed to each other with respect to display region 300 interposed therebetween. Drive circuit region 450 may be included in a circuit board provided outside display panel 200. In drive circuit region 450, a common voltage generating circuit and a control circuit (not illustrated) may be provided in addition to the gate driver and the source driver.

Figure 2:
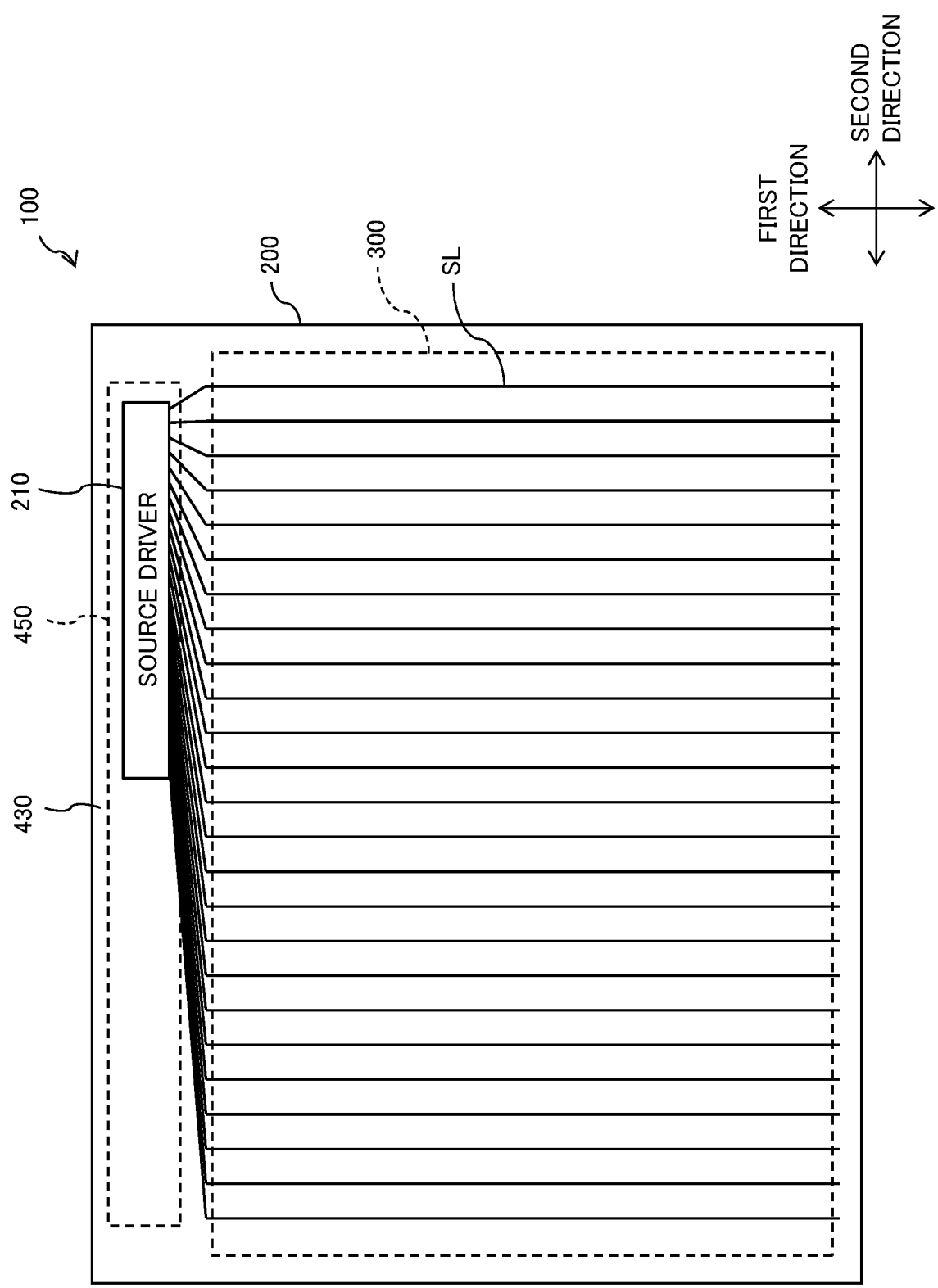
FIG. 2 is a plan view illustrating disposition of a source driver and a source line in the liquid crystal display device according to the exemplary embodiment.

FIG. 2 is a plan view illustrating disposition of the source driver and the source line of the exemplary embodiment. Liquid crystal display device 100 includes a plurality of source lines SL and a source driver 210 that outputs a video signal (source signal) to each source line SL. Source driver 210 is disposed in upper region 430. Each source line SL is connected to source driver 210, and extends in a first direction (vertical direction). More specifically, the plurality of source lines SL are arranged at substantially equal intervals in a second direction (horizontal direction) intersecting the first direction, and extend in the first direction so as to cross a space between a plurality of pixels and a space between a plurality of subpixels included in one pixel. At this point, the plurality of subpixels are arranged in the second direction in one pixel.

Figure 3:
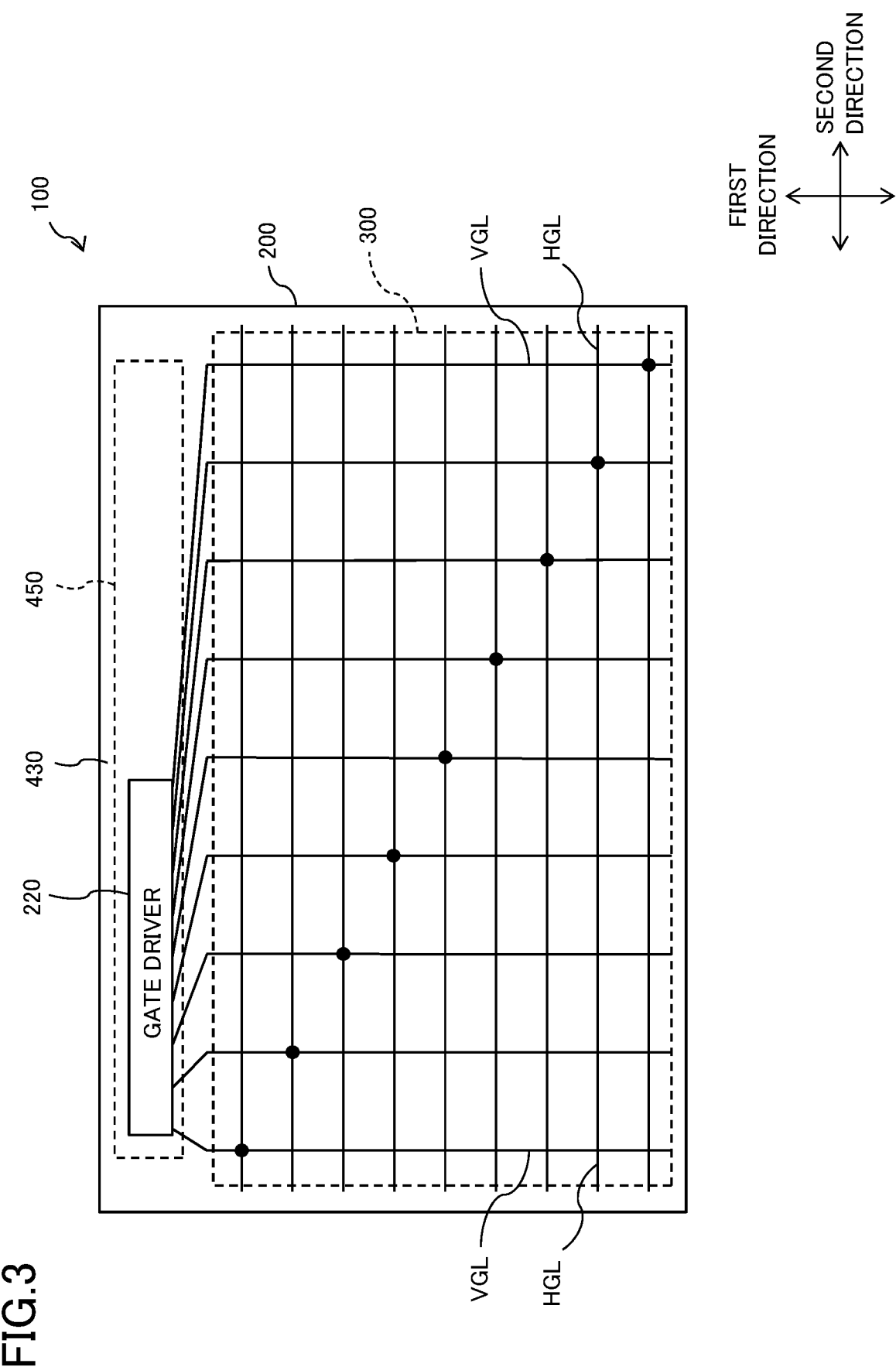
FIG. 3 is a plan view illustrating disposition of a gate driver and a gate line in the liquid crystal display device according to the exemplary embodiment.

FIG. 3 is a plan view illustrating disposition of the gate driver and the gate line of the exemplary embodiment. Liquid crystal display device 100 includes a plurality of gate lines HGL, a plurality of gate lead lines VGL, and gate driver 220. In the exemplary embodiment, gate driver 220 is disposed in upper region 430 together with source driver 210. Gate driver 220 may horizontally be disposed side by side with source driver 210 in upper region 430, or may vertically be disposed side by side with source driver 210. The plurality of gate lines HGL are electrically connected to the plurality of gate lead lines VGL, and are connected to gate driver 220 through gate lead lines VGL.

The plurality of gate lines HGL extend in the second direction so as to cross the space between the plurality of pixels, and are arranged at substantially equal intervals in the first direction. On the other hand, the plurality of gate lead lines VGL extend in the first direction so as to cross the space between the plurality of pixels, and are disposed at substantially equal intervals in the second direction. At this point, the plurality of gate lead lines VGL are disposed so as not to cross the space between the plurality of subpixels included in one pixel.

Figure 4:
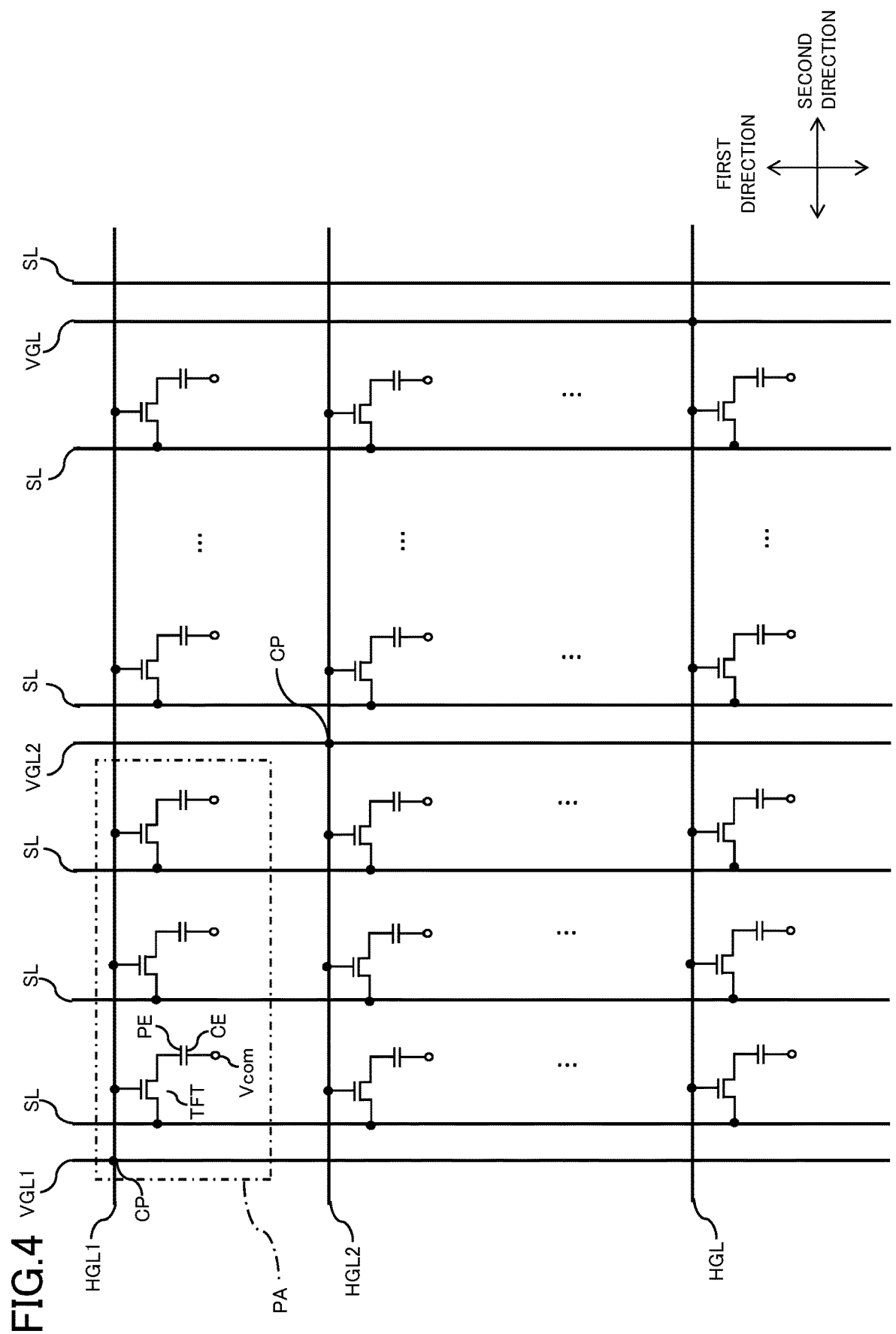
FIG. 4 is a circuit diagram illustrating a schematic configuration of a pixel region of display panel in the liquid crystal display device according to the exemplary embodiment.

FIG. 4 is a circuit diagram illustrating a schematic configuration of a pixel region of display panel 200 of the exemplary embodiment. In display region 300 of display panel 200, a plurality of pixel regions PA partitioned by the plurality of gate lines HGL and the plurality of source lines SL are arranged in a matrix form. Display panel 200 includes a plurality of subpixel electrodes PE formed in a plurality of pixel regions PA, common electrode CE corresponding to the plurality of subpixel electrodes PE, and a plurality of thin film transistors TFT formed in a vicinity of an intersection of each gate line HGL and each source line SL. Common electrode CE has common potential Vcom.

As illustrated in FIG. 4, a region surrounded by gate lead line VGL and gate line HGL corresponds to one pixel region PA, and pixel regions PA are arranged in the first direction and the second direction. A region surrounded by source line SL and gate line HGL corresponds to one subpixel, and the subpixels are arranged in the second direction in one pixel region PA.

Each gate lead line VGL is electrically connected to one gate line HGL at one intersection in a plurality of intersections with the plurality of gate lines HGL. The intersection where gate lead line VGL and gate line HGL are electrically connected to each other is referred to as a "connection portion CP".

Connection portion CP is disposed according to a certain rule based on a scanning direction (vertical direction) in which the plurality of gate lines HGL are arranged and a horizontal direction in which the plurality of gate lead lines VGL are arranged. For example, connection portion CP is disposed at the intersection region of first gate line HGL1 and first gate lead line VGL1. However, connection portion CP is not disposed at the intersection region of first gate line HGL1 and second gate lead line VGL2. Connection portion CP is not disposed at the intersection region of second gate line HGL2 and first gate lead line VGL1, but connection portion CP is disposed at the intersection region of second gate line HGL2 and second gate lead line VGL2.

Gate driver 220 outputs a gate signal as a scanning signal to each gate lead line VGL. Each gate lead line VGL is electrically connected to each gate line HGL at connection portion CP, and the gate signal is transmitted to each gate line HGL through each gate lead line VGL. Display panel 200 displays an image in display region 300 according to the source signal and the gate signal.

Figure 5:
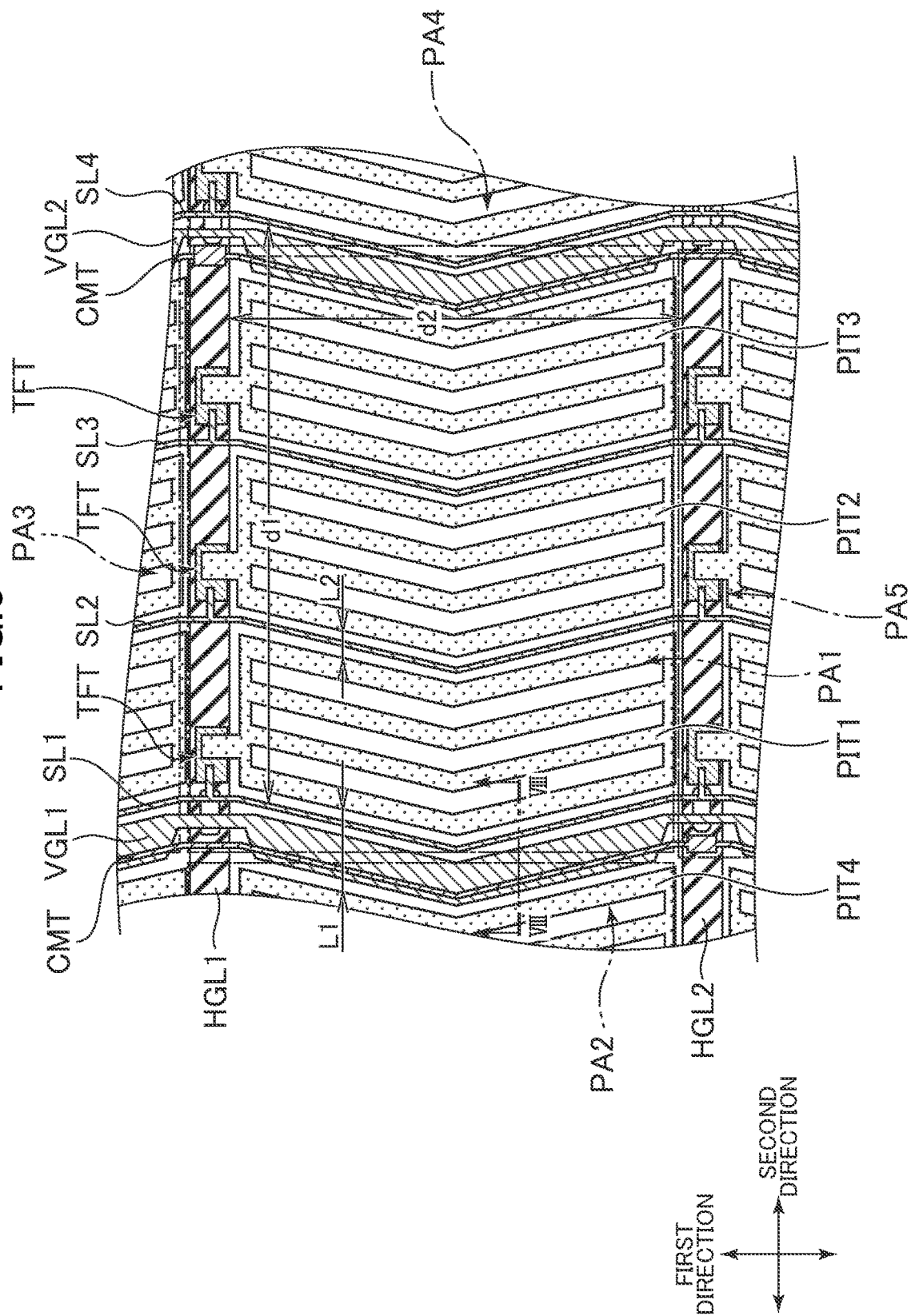
FIG. 5 is a schematic plan view illustrating a schematic configuration of a periphery of one pixel region in the liquid crystal display device according to the exemplary embodiment.

FIG. 5 is a schematic plan view illustrating a schematic configuration of a periphery of one pixel region PA. First pixel region PA1 illustrated in a center of FIG. 5, second pixel region PA2 disposed adjacent to first pixel region PA1 on a left side of first pixel region PA1, and fourth pixel region PA4 disposed adjacent to first pixel region PA1 on a right side of first pixel region PA1 are arranged in the second direction. That is, in the second direction, fourth pixel region PA4 is disposed on an opposite side to second pixel region PA2 with respect to first pixel region PA1. In the first direction, third pixel region PA3 is disposed adjacent to first pixel region PA1. In the first direction, fifth pixel region PA5 is disposed on the opposite side to third pixel region PA3 with respect to first pixel region PA1 so as to be adjacent to first pixel region PA1.

First gate lead line VGL1 is disposed between first pixel region PA1 and second pixel region PA2, and extends in the first direction so as to cross the space between first pixel region PA1 and second pixel region PA2. First gate line HGL1 is disposed between first pixel region PA1 and third pixel region PA3, and extends in the second direction so as to cross the space between first pixel region PA1 and third pixel region PA3. First gate line HGL1 and first gate lead line VGL1 are electrically connected to each other in a first intersection region that is an intersection region of first gate line HGL1 and first gate lead line VGL1.

First subpixel electrode PIT1, second subpixel electrode PIT2, and third subpixel electrode PIT3 that are arranged in the second direction are disposed in first pixel region PA1. Thin film transistor TFT connected to each of first subpixel electrode PIT1, second subpixel electrode PIT2, and third subpixel electrode PIT3 is connected to first gate line HGL1.

Each thin film transistor TFT is connected to source line SL. The plurality of source lines SL extend in the first direction, and are disposed so as to cross the space between the plurality of subpixel electrodes and the space between the plurality of pixels. Specifically, first source line SL1 extends in the first direction so as to cross the space between first pixel region PA1 and second pixel region PA2, second source line SL2 extends in the first direction so as to cross the space between first subpixel electrode PIT1 and second subpixel electrode PIT2, and third source line SL3 extends in the first direction so as to cross the space between second subpixel electrode PIT2 and third subpixel electrode PIT3.

While each source line SL is disposed so as to cross the space between the plurality of subpixel electrodes, gate lead line VGL is not disposed between the plurality of subpixel electrodes included in one pixel. As described above, because the plurality of gate lead lines VGL are configured not to cross the space between the plurality of subpixels included in one pixel, an interval between the subpixels in one pixel can substantially be equalized, and resultantly the generation of the unevenness can be prevented in the displayed image.

In the exemplary embodiment, as described above, first gate lead line VGL1 is disposed so as to cross the space between first pixel region PA1 and second pixel region PA2. That is, as illustrated in FIG. 5, first gate lead line VGL1 is disposed so as to cross the space between first subpixel electrode PIT1 included in first pixel region PA1 and fourth subpixel electrode PIT4 included in second pixel region PA2. First subpixel electrode PIT1 and fourth subpixel electrode PIT4 are adjacent to each other, and first subpixel electrode PIT1 and second subpixel electrode PIT2 are adjacent to each other. In the exemplary embodiment, a first distance L1 between first subpixel electrode PIT1 and fourth subpixel electrode PIT4 is larger than a second distance L2 between first subpixel electrode PIT1 and second subpixel electrode PIT2. In the exemplary embodiment, the first distance is greater than or equal to two times the second distance and less than or equal to five times the second distance. By setting the first distance greater than or equal to two times the second distance, an area where first gate lead line VGL1 is disposed can be secured between first pixel region PA1 and second pixel region PA2. By setting the first distance less than or equal to five times the second distance, the aperture ratio of the entire display panel 200 can be secured.

By disposing each source line SL between each subpixel, a video signal (source signal) can be transmitted to each subpixel without providing special source driver 210.

Second gate lead line VGL2 is disposed between first pixel region PA1 and fourth pixel region PA4, and extends in the first direction so as to cross the space between first pixel region PA1 and fourth pixel region PA4. As described above, while first gate line HGL1 and first gate lead line VGL1 are electrically connected to each other in the first intersection region that is the intersection region of first gate line HGL1 and first gate lead line VGL1, first gate line HGL1 and second gate lead line VGL2 are not electrically connected to each other in the second intersection region that is the intersection region of first gate line HGL1 and second gate lead line VGL2.

Figure 6:
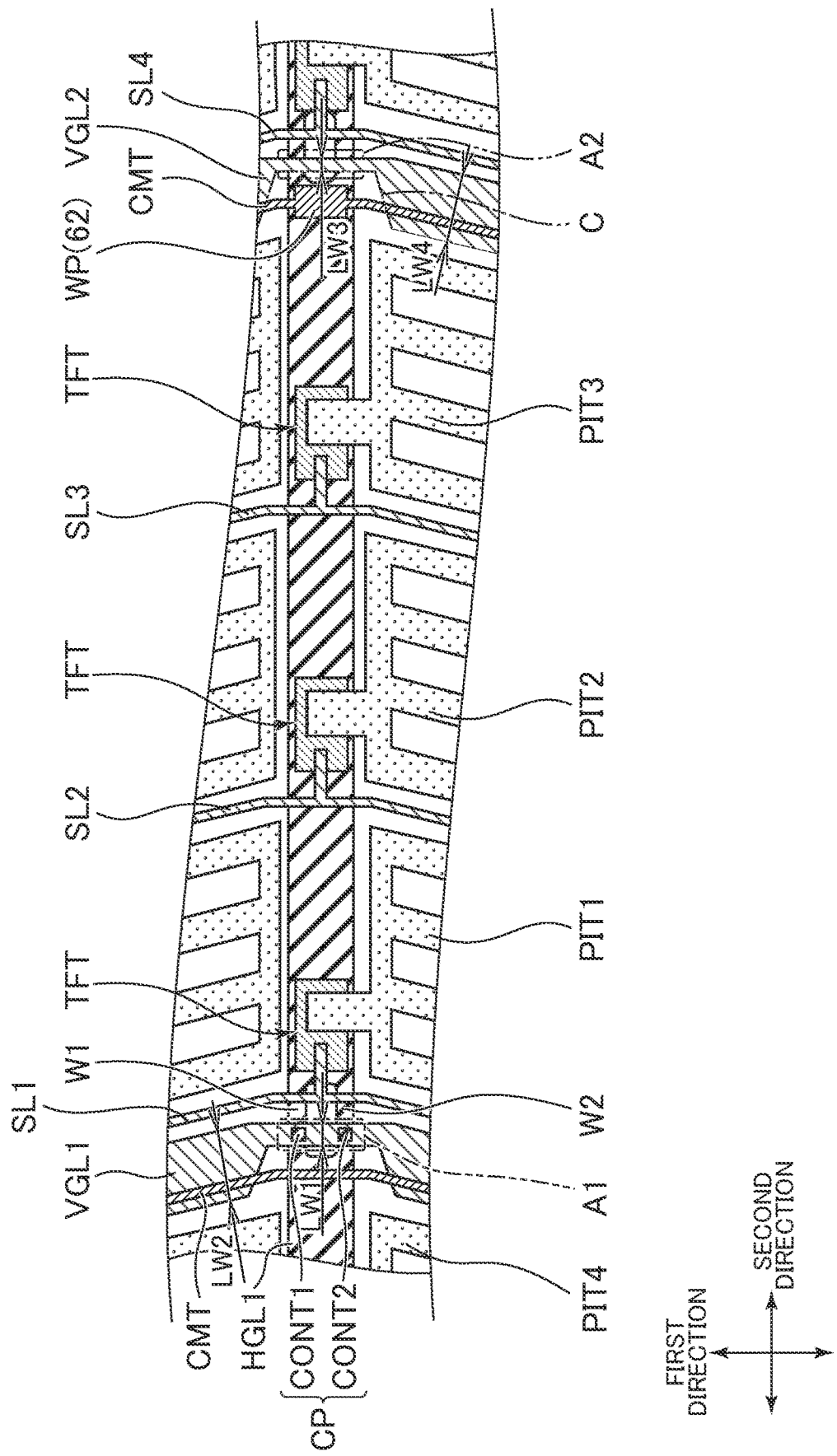
FIG. 6 is a schematic plan view illustrating a schematic configuration of the periphery of a horizontal gate line in the liquid crystal display device according to the exemplary embodiment.

FIG. 6 is a schematic plan view illustrating a schematic configuration of the periphery of first gate line HGL1 disposed between first pixel region PA1 and third pixel region PA3. As illustrated in FIG. 6, first gate line HGL1 and first gate lead line VGL1 intersect each other in first intersection region A1. First gate line HGL1 and second gate lead line VGL2 intersect each other in second intersection region A2. A line width LW1 of first gate lead line VGL1 in first intersection region A1 is smaller than a line width LW2 of first gate lead line VGL1 between first pixel region PA1 and second pixel region PA2. Similarly, a line width LW3 of second gate lead line VGL2 in second intersection region A2 is smaller than a line width LW4 of second gate lead line VGL2 between first pixel region PA1 and fourth pixel region PA4. With this configuration, generation of parasitic capacitance can be prevented between first gate lead line VGL1 and first gate line HGL1, and generation of parasitic capacitance can be prevented between second gate lead line VGL2 and first gate line HGL1. The line widths of first gate lead line VGL1 and second gate lead line VGL2 is greater than or equal to the line widths of first intersection region A1 and second intersection region A2 between first pixel region PA1 and second pixel region PA2 and between first pixel region PA1 and fourth pixel region PA4, which allows the decreases in resistance values of first gate lead line VGL1 and second gate lead line VGL2.

In the exemplary embodiment, the line width LW1 of first gate lead line VGL1 in first intersection region A1 is greater than the line width LW3 of second gate lead line VGL2 in second intersection region A2. This is because an area where connection portion CP that electrically connects first gate lead line VGL1 and first gate line HGL1 is provided is secured in first intersection region A1. The line width LW3 of second gate lead line VGL2 in second intersection region A2 is smaller than the line width LW1 of first gate lead line VGL1 in first intersection region A1, which allows the generation of the parasitic capacitance to be prevented between second gate lead line VGL2 and first gate line HGL1.

In the exemplary embodiment, as illustrated in FIG. 5, the distance d1 in the second direction between first source line SL1 crossing the space between first pixel region PA1 and second pixel region PA2 and fourth source line SL4 crossing the space between first pixel region PA1 and fourth pixel region PA4 is equal to the distance d2 in the first direction between first gate line HGL1 crossing the space between first pixel region PA1 and third pixel region PA3 and second gate line HGL2 crossing the space between first pixel region PA1 and fifth pixel region PA5.

Figure 7:
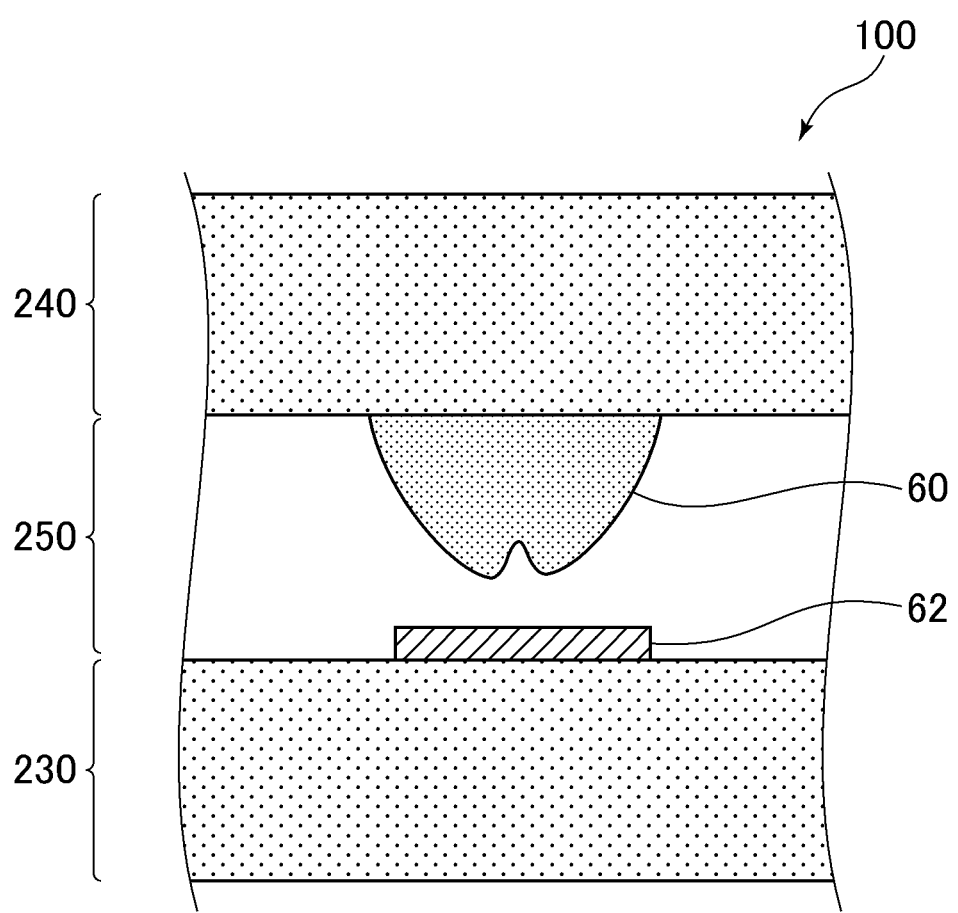
FIG. 7 is a schematic sectional view illustrating disposition of a spacer in the liquid crystal display device according to the exemplary embodiment.

FIG. 7 is a schematic sectional view illustrating disposition of a spacer in the liquid crystal display device of the exemplary embodiment. In the exemplary embodiment, liquid crystal display device 100 includes thin film transistor substrate 230 and counter substrate 240 opposed to thin film transistor substrate 230, and liquid crystal layer 250 is disposed between thin film transistor substrate 230 and counter substrate 240. A plurality of spacers 60 protruding toward thin film transistor substrate 230 are provided on the rear surface side of counter substrate 240. Spacer 60 serves to keep the distance between thin film transistor substrate 230 and counter substrate 240 in the display surface constant. Pedestal 62 opposed to the spacer is disposed on the display surface side of thin film transistor substrate 230. For example, spacer 60 can be formed by an insulating film made of resin, and pedestal 62 can be formed by an island-shaped semiconductor film or a metal film.

In the exemplary embodiment, as illustrated in FIG. 6, pedestal 62 is disposed in the vicinity of second intersection region A2. Specifically, in second intersection region A2, second gate lead line VGL2 includes narrowed portion C in which the line width is reduced, and pedestal 62 is provided in narrowed portion C. By providing pedestal 62 in narrowed portion C, pedestal 62 and second gate lead line VGL2 can be disposed in a limited space, so that the aperture ratio of the entire liquid crystal display device can be increased.

In the exemplary embodiment, an example in which pedestal 62 is formed using a part of common electrode line CMT connected to common electrode CE (see FIG. 4) that is disposed while opposed to the plurality of subpixel electrodes PIT will be illustrated with reference to FIG. 6. Common electrode line CMT extends in the first direction, and is disposed so as to cross the space between the plurality of pixels. Common electrode line CMT crossing the space between first pixel region PA1 and fourth pixel region PA4 is also disposed in second intersection region A2. In second intersection region A2, common electrode line CMT includes wide portion WP having the line width greater than the line width between first pixel region PA1 and fourth pixel region PA4, and wide portion WP constitutes pedestal 62.

Spacer 60 may be disposed so as to overlap with first gate lead line VGL1 in planar view between first pixel region PA1 and second pixel region PA2 in FIG. 5, or disposed so as to overlap with second gate lead line VGL2 in planar view between first pixel region PA1 and fourth pixel region PA4. Spacer 60 can be disposed by taking advantage of a disposition region of first gate lead line VGL1 and second gate lead line VGL2, and the distance between thin film transistor substrate 230 and counter substrate 240 can further be kept constant in the display surface without decreasing the aperture ratio.

In the exemplary embodiment, as described above, first gate lead line VGL1 includes connection portion CP connected in first intersection region A1 intersecting first gate line HGL1 in planar view. In the present embodiment, as illustrated in FIG. 6, connection portion CP includes first contact portion CONT1 and second contact portion CONT2. More specifically, first gate line HGL1 is branched into first wiring W1 and second wiring W2 in first intersection region A1, first wiring W1 and first gate lead line VGL1 are connected to each other at first contact portion CONT1, and second wiring W2 and first gate lead line VGL1 are connected to each other at second contact portion CONT2. More specifically, an insulating film is formed between first gate lead line VGL1 and first gate line HGL1, and through-holes are made at locations corresponding to first contact portion CONT1 and second contact portion CONT2. First gate lead line VGL1 and first gate line HGL1 are connected to each other through the through-holes.

With this configuration, for example, even in the case where first gate line HGL1 and first source line SL1 crossing first gate line HGL1 are short-circuited, the electric connection between first gate lead line VGL1 and first gate line HGL1 can be maintained in a proper state. As a specific example, in the case where second wiring W2 in first gate line HGL1 and first source line SL1 are short-circuited, even if second wiring W2 is cut to electrically disconnect first gate line HGL1 and first source line SL1, the electric connection between first wiring W1 and first gate lead line VGL1 is maintained by first contact portion CONT1, so that the electric connection between first gate lead line VGL1 and first gate line HGL1 can be maintained in the proper state. On the other hand, in the case where first wiring W1 and first source line SL1 are short-circuited, even if the first wiring W1 is cut, the electric connection between second wiring W2 and first gate lead line VGL1 is maintained by second contact portion CONT2, so that the electric connection between first gate lead line VGL1 and first gate line HGL1 can be maintained in the proper state.

Figure 8:
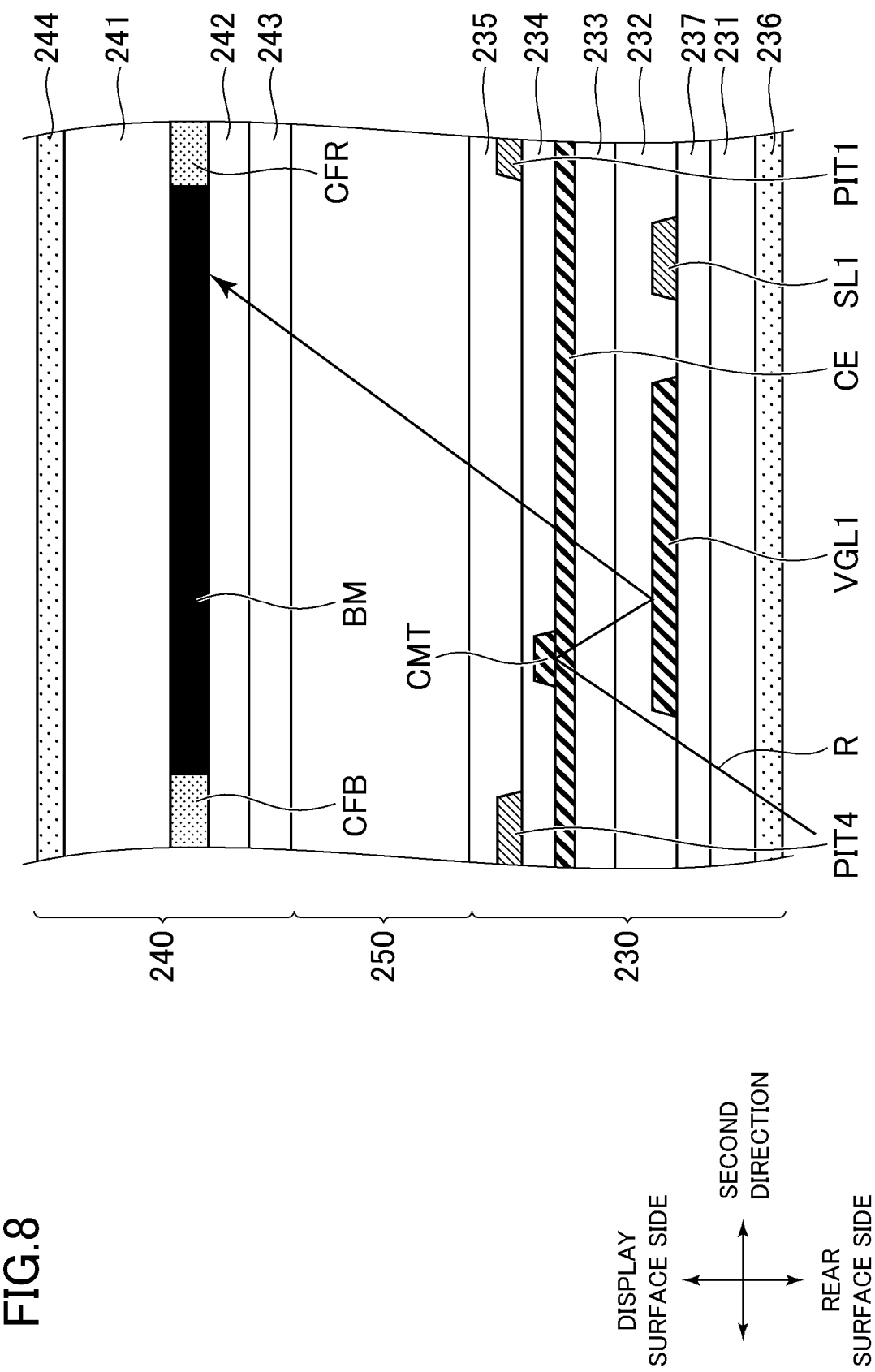
FIG. 8 is a sectional view taken along line VIII-VIII in FIG. 5.

FIG. 8 is a sectional view taken along line VIII-VIII in FIG. 5. Display panel 200 includes thin film transistor substrate 230 disposed on the rear surface side, counter substrate 240 disposed on the display surface side and opposed to thin film transistor substrate 230, and liquid crystal layer 250 sandwiched between thin film transistor substrate 230 and counter substrate 240.

Thin film transistor substrate 230 includes glass substrate 231 and gate insulator 237 formed on the display surface side of glass substrate 231. First gate lead line VGL1 and first source line SL1 are formed on the display surface side of gate insulator 237. That is, first gate lead line VGL1 and source line SL1 are formed in the same layer. Thin film transistor substrate 230 includes first insulating film 232 formed so as to cover first gate lead line VGL1 and first source line SL1, second insulating film 233 formed on the display surface side of first insulating film 232, and common electrode CE formed on the display surface side of second insulating film 233. Common electrode line CMT is connected to the common electrode CE at display surface side of common electrode CE. In the exemplary embodiment, common electrode line CMT overlaps with first gate lead line VGL1 in planar view. Thin film transistor substrate 230 further includes third insulating film 234 formed so as to cover common electrode line CMT, and first subpixel electrode PIT1 and fourth subpixel electrode PIT4 that are formed on the display surface side of third insulating film 234. Alignment film 235 is formed on the display surface side of third insulating film 234 so as to cover first subpixel electrode PIT1 and fourth subpixel electrode PIT4. Polarizing plate 236 is formed on the rear surface side of glass substrate 231.

Counter substrate 240 includes black matrix BM, red color filter CFR, and blue color filter CFB that are formed on glass substrate 241. Red color filter CFR overlaps with first subpixel electrode PIT1 disposed closest to second pixel region PA2 among the plurality of subpixel electrodes PIT included in first pixel region PA1 in planar view. Blue color filter CFB is disposed so as to overlap with fourth subpixel electrode PIT4 included in second pixel region PA2 in planar view. Counter substrate 240 further includes overcoat film 242 provided so as to cover the rear surface sides of black matrix BM, red color filter CFR, and blue color filter CFB and alignment film 243 provided so as to cover the rear surface side of overcoat film 242. Polarizing plate 244 is formed on the display surface side of glass substrate 241.

In the exemplary embodiment, as illustrated in FIG. 8, common electrode line CMT is disposed closer to fourth subpixel electrode PIT4 than to first subpixel electrode PIT1. That is, common electrode line CMT is disposed closer to second pixel region PA2 than to first pixel region PA1.

With this configuration, a more beautiful black color can be displayed when black display is performed on display panel 200. Even in the black display, ray R from the backlight is reflected by common electrode line CMT and first gate lead line VGL1, and may reach color filter CF included in counter substrate 240. At this time, because common electrode line CMT and first gate lead line VGL1 are made of copper, there is a high possibility that reflected ray R contains many red components. In the case where ray R reaches red color filter CFR, there is a possibility that, in spite of the black display, the display turns reddish black when obliquely viewed. However, as in the exemplary embodiment, common electrode line CMT is disposed away from first subpixel electrode PIT1 overlapping with red color filter CFR, which allows reduction of the possibility that ray R having many red components reaches red color filter CFR. As a result, more beautiful black color can be displayed when the black display is performed on display panel 200.

In the exemplary embodiment, the first distance in the second direction between first subpixel electrode PIT1 and fourth subpixel electrode PIT4 is larger than the second distance in the second direction between first subpixel electrode PIT1 and second subpixel electrode PIT2. Consequently, the configuration in which common electrode line CMT is separated from first subpixel electrode PIT1 can easily be implemented by bringing common electrode line CMT closer to fourth subpixel electrode PIT4. In the exemplary embodiment, the first distance is greater than or equal to two times the second distance and less than or equal to five times the second distance. The configuration in which common electrode line CMT is separated from first subpixel electrode PIT1 can easily be implemented by setting the first distance greater than or equal to two times the second distance. By setting the first distance less than or equal to five times the second distance, the aperture ratio of the entire display panel 200 can be secured.

The liquid crystal display devices of the exemplary embodiment may be combined with each other. Each liquid crystal display device can be applied to various types of liquid crystal display devices.

For example, the liquid crystal display device can be applied to a liquid crystal display device of so-called vertically divided drive in which the display region is driven while divided into upper and lower portions. In this case, each gate lead line VGL is electrically connected to one gate line HGL at connection portion CP of the upper region, and electrically connected to another gate line HGL at connection portion CP of the lower region.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
   a plurality of pixels arranged in a first direction and a second direction intersecting the first direction, the plurality of pixels including a first pixel, a second pixel disposed adjacent to the first pixel in the second direction, and a third pixel disposed adjacent to the first pixel in the first direction;
   a plurality of subpixel electrodes arranged in each of the plurality of pixels in the second direction;
   a plurality of source lines extending in the first direction and crossing a space between the plurality of subpixel electrodes and a space between the first pixel and the second pixel;
   a first gate lead line extending in the first direction and crossing a space between the first pixel and the second pixel;
   a first gate line extending in the second direction, crossing a space between the first pixel and the third pixel, and is electrically connected to the first gate lead line;
   a fourth pixel disposed adjacent to the first pixel in the second direction and disposed on an opposite side to the second pixel with respect to the first pixel; and
   a second gate lead line extending in the first direction and crossing a space between the first pixel and the fourth pixel,
   wherein the first gate lead line is connected to the first gate line in a first intersection region intersecting the first gate line in planar view,
   the second gate lead line is not connected to the first gate line in a second intersection region intersecting the first gate line in planar view, and
   a line width of the first gate lead line in the first intersection region is greater than a line width of the second gate lead line in the second intersection region.

2. The liquid crystal display device according to claim 1, wherein the first pixel includes at least a first subpixel electrode and a second subpixel electrode,
   the second pixel includes at least a fourth subpixel electrode,
   the first subpixel electrode is adjacent to the second subpixel electrode and the fourth subpixel electrode in the second direction,
   a first distance in the second direction between the first subpixel electrode and the fourth subpixel electrode is larger than a second distance in the second direction between the first subpixel electrode and the second subpixel electrode.

3. The liquid crystal display device according to claim 2, wherein the first distance is greater than or equal to two times the second distance.

4. The liquid crystal display device according to claim 3, wherein the first distance is less than or equal to five times the second distance.

5. The liquid crystal display device according to claim 1, wherein the plurality of source lines and the first gate lead line are formed in the same layer.

6. The liquid crystal display device according to claim 1, further comprising an insulating film disposed between the first gate lead line and the first gate line,
   wherein the first gate lead line and the first gate line are connected to each other through a through-hole formed in the insulating film.

7. The liquid crystal display device according to claim 1, further comprising:
   a fifth pixel disposed adjacent to the first pixel in the first direction and disposed on an opposite side to the third pixel with respect to the first pixel; and
   a second gate line extending in the second direction and crossing a space between the first pixel and the fifth pixel,
   wherein the plurality of source lines further includes:
   a first source line crossing a space between the first pixel and the second pixel; and
   a fourth source line crossing a space between the first pixel and the fourth pixel, and
   a distance in the second direction between the first source line and the fourth source line is equal to a distance in the first direction between the first gate line and the second gate line.

8. The liquid crystal display device according to claim 1, further comprising:
   a thin film transistor substrate on which the plurality of source lines are formed;
   a counter substrate opposed to the thin film transistor substrate;
   a plurality of spacers protruding from the counter substrate toward the thin film transistor substrate; and
   a pedestal that overlaps with the spacer in planar view,
   wherein the second gate lead line includes a narrowed portion in which a line width is reduced in the second intersection region, and
   the pedestal is disposed in the narrowed portion.

9. The liquid crystal display device according to claim 8, wherein the pedestal is an island-shaped semiconductor film or a metal film.

10. The liquid crystal display device according to claim 8, further comprising:
    a common electrode opposed to the plurality of subpixel electrodes; and
    a common electrode line extending in the first direction crossing a space between the first pixel and the fourth pixel, and being electrically connected to the common electrode, wherein the common electrode line includes a wide portion having a line width wider than a line width between the first pixel and the fourth pixel in the second intersection region, and at least one of the plurality of spacers overlaps with the wide portion in planar view.

11. The liquid crystal display device according to claim 1, further comprising:
a thin film transistor substrate on which the plurality of source lines are formed;
a counter substrate opposed to the thin film transistor substrate; and
a plurality of spacers protruding from the counter substrate toward the thin film transistor substrate,
wherein at least one of the plurality of spacers overlaps with the first gate lead line between the first pixel and the second pixel in planar view.

12. The liquid crystal display device according to claim 1, wherein the first gate lead line is connected to the first gate line in a first intersection region intersecting the first gate line in planar view,
the first gate line is branched into a first wiring and a second wiring in the first intersection region,
the first wiring and the second wiring intersect the source line,
the first wiring and the first gate lead line are connected to each other at a first contact portion, and
the second wiring and the first gate lead line are connected to each other at a second contact portion.

13. The liquid crystal display device according to claim 1, wherein
the first gate lead line is connected to the first gate line in a first intersection region intersecting the first gate line in planar view, and
a line width of the first gate lead line in the first intersection region is smaller than a line width of the first gate lead line between the first pixel and the second pixel.

14. The liquid crystal display device according to claim 2, further comprising:
a thin film transistor substrate on which the plurality of source lines are formed; and
a counter substrate opposed to the thin film transistor substrate,
wherein the thin film transistor substrate further includes:
a common electrode opposed to the plurality of subpixel electrodes; and
a common electrode line extending in the first direction, crossing a space between the first pixel and the second pixel, and being electrically connected to the common electrode,
the first subpixel electrode overlaps with a red color filter included in the counter substrate in planar view, and
the common electrode line is disposed closer to the fourth subpixel electrode than to the first subpixel electrode.

15. The liquid crystal display device according to claim 14, wherein the common electrode line overlaps with the first gate lead line in planar view.

16. A liquid crystal display device comprising:
a plurality of pixels arranged in a first direction and a second direction intersecting the first direction, the plurality of pixels including a first pixel, a second pixel disposed adjacent to the first pixel in the second direction, and a third pixel disposed adjacent to the first pixel in the first direction;
a plurality of subpixel electrodes arranged in each of the plurality of pixels in the second direction;

a plurality of source lines extending in the first direction and crossing a space between the plurality of subpixel electrodes and a space between the first pixel and the second pixel;
a first gate lead line extending in the first direction and crossing a space between the first pixel and the second pixel; and
a first gate line extending in the second direction, crossing a space between the first pixel and the third pixel, and is electrically connected to the first gate lead line,
wherein the first gate lead line is connected to the first gate line in a first intersection region intersecting the first gate line in planar view, and
a line width of the first gate lead line in the first intersection region is smaller than a line width of the first gate lead line between the first pixel and the second pixel.

17. A liquid crystal display device comprising:
a plurality of pixels arranged in a first direction and a second direction intersecting the first direction, the plurality of pixels including a first pixel, a second pixel disposed adjacent to the first pixel in the second direction, and a third pixel disposed adjacent to the first pixel in the first direction;
a plurality of subpixel electrodes arranged in each of the plurality of pixels in the second direction;
a plurality of source lines extending in the first direction and crossing a space between the plurality of subpixel electrodes and a space between the first pixel and the second pixel;
a first gate lead line extending in the first direction and crossing a space between the first pixel and the second pixel;
a first gate line extending in the second direction, crossing a space between the first pixel and the third pixel, and is electrically connected to the first gate lead line;
a thin film transistor substrate on which the plurality of source lines are formed; and
a counter substrate opposed to the thin film transistor substrate,
wherein the first pixel includes at least a first subpixel electrode and a second subpixel electrode,
the second pixel includes at least a fourth subpixel electrode,
the first subpixel electrode is adjacent to the second subpixel electrode and the fourth subpixel electrode in the second direction,
a first distance in the second direction between the first subpixel electrode and the fourth subpixel electrode is larger than a second distance in the second direction between the first subpixel electrode and the second subpixel electrode;
the thin film transistor substrate further includes:
a common electrode opposed to the plurality of subpixel electrodes; and
a common electrode line extending in the first direction, crossing a space between the first pixel and the second pixel, and being electrically connected to the common electrode,
the first subpixel electrode overlaps with a red color filter included in the counter substrate in planar view, and
the common electrode line is disposed closer to the fourth subpixel electrode than to the first subpixel electrode.

18. The liquid crystal display device according to claim 17, wherein the common electrode line overlaps with the first gate lead line in planar view.

* * * * *